United States Patent
Sakurai et al.

(10) Patent No.: US 8,102,616 B2
(45) Date of Patent: Jan. 24, 2012

(54) MAGNETIC RECORDING MEDIUM, METHOD OF FABRICATING THE SAME, AND MAGNETIC RECORDING APPARATUS

(75) Inventors: Masatoshi Sakurai, Tokyo (JP); Kazuto Kashiwagi, Yokohama (JP); Akira Kikitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/973,171

(22) Filed: Dec. 20, 2010

(65) Prior Publication Data

US 2011/0085268 A1    Apr. 14, 2011

Related U.S. Application Data

(63) Continuation of application No. 11/819,916, filed on Jun. 29, 2007, now Pat. No. 7,894,155.

(30) Foreign Application Priority Data

Jun. 30, 2006 (JP) .................................. 2006-182736

(51) Int. Cl.
*G11B 21/02* (2006.01)

(52) U.S. Cl. ........... 360/75; 360/48; 360/53; 360/77.02; 360/78.04

(58) Field of Classification Search .................. None
See application file for complete search history.

(56) References Cited

U.S. PATENT DOCUMENTS

| | | | | |
|---|---|---|---|---|
| 5,677,819 A * | 10/1997 | Seko et al. | | 360/135 |
| 6,313,969 B1 * | 11/2001 | Hattori et al. | | 360/135 |
| 6,421,195 B1 * | 7/2002 | Rubin et al. | | 360/48 |
| 6,977,108 B2 * | 12/2005 | Hieda et al. | | 428/64.2 |
| 7,009,791 B2 * | 3/2006 | Shimatani | | 360/29 |
| 7,236,324 B2 * | 6/2007 | Albrecht et al. | | 360/75 |
| 7,548,388 B2 | 6/2009 | Kaizu et al. | | |
| 7,738,213 B2 | 6/2010 | Okino et al. | | |
| 7,782,561 B2 * | 8/2010 | Albrecht et al. | | 360/48 |
| 7,864,470 B2 * | 1/2011 | Gao et al. | | 360/51 |
| 2002/0136927 A1 * | 9/2002 | Hieda et al. | | 428/694 T |
| 2002/0168548 A1 * | 11/2002 | Sakurai et al. | | 428/694 BR |
| 2004/0137150 A1 | 7/2004 | Saito et al. | | |
| 2005/0117253 A1 * | 6/2005 | Moriya et al. | | 360/135 |
| 2005/0122612 A1 | 6/2005 | Albrecht et al. | | |
| 2005/0219730 A1 | 10/2005 | Sakurai et al. | | |
| 2006/0061900 A1 * | 3/2006 | Ohtsuka et al. | | 360/69 |
| 2006/0204794 A1 * | 9/2006 | Kikuchi et al. | | 428/836.2 |
| 2007/0258161 A1 * | 11/2007 | Richter et al. | | 360/48 |

FOREIGN PATENT DOCUMENTS

| | | |
|---|---|---|
| JP | 10-040540 | 2/1998 |
| JP | 10-255257 | 9/1998 |
| JP | 2000-020945 | 1/2000 |
| JP | 2001-034902 | 2/2001 |
| JP | 2002-279616 | 9/2002 |
| JP | 2002-334414 | 11/2002 |

(Continued)

*Primary Examiner* — Dismery Mercedes

(74) *Attorney, Agent, or Firm* — Pillsbury Winthrop Shaw Pittman, LLP

(57) ABSTRACT

According to one embodiment, there is provided a magnetic recording medium having a data region in which a plurality of recording tracks, each including magnetic dots arrayed in a down-track direction with a pitch p, are formed in a cross-track direction, and a servo region including a preamble in which a plurality of lines of magnetic dots, which are arrayed in a cross-track direction with a pitch p, are formed at equal intervals in the down-track direction.

2 Claims, 7 Drawing Sheets

FOREIGN PATENT DOCUMENTS

| | | |
|---|---|---|
| JP | 2003-157503 | 5/2003 |
| JP | 2004-238713 | 8/2004 |
| JP | 2004-295990 | 10/2004 |
| JP | 2004-295991 | 10/2004 |
| JP | 2005-108361 | 4/2005 |
| JP | 2005-293730 | 10/2005 |
| JP | 2006-031855 | 2/2006 |
| JP | 2006-031856 | 2/2006 |
| JP | 2006-073137 | 3/2006 |
| JP | 2006-075942 | 3/2006 |
| JP | 2006-120222 | 5/2006 |

* cited by examiner

FIG. 1 (modified) PRESENT INVENTION

MAGNETIC RECORDING MEDIUM, METHOD OF FABRICATING THE SAME, AND MAGNETIC RECORDING APPARATUS

CROSS-REFERENCE TO RELATED APPLICATIONS

This application is a continuation of co-pending U.S. application Ser. No. 11/819,916, filed Jun. 29, 2007, and for which priority is claimed under 35 U.S.C. §120. This application is based upon and claims the benefit of priority under 35 U.S.C. §119 from the prior Japanese Patent Application No. 2006-182736, filed Jun. 30, 2006, the entire contents of all applications are incorporated herein by reference in their entireties.

BACKGROUND

1. Field

One embodiment of the present invention relates to a magnetic recording medium and a method of fabricating the magnetic recording medium, and a magnetic recording apparatus in which the magnetic recording medium is installed.

2. Description of the Related Art

In the modern information-oriented society, the amount of information has been increasing more and more. To keep up with this information-oriented society, there has been a demand for a recording/reproduction method with a dramatically increased recording density, and a recording/reproduction apparatus and a recording medium based on such a recording/reproduction method. To meet the demand, the recording medium is required to have smaller recording marks that are minimum units for writing information. At present, however, there is difficulty in reducing the size of each recording mark in the recording medium.

For example, in the case of a magnetic recording medium such as a hard disk drive, a recording layer includes a great number of magnetic crystal grains with a wide grain size distribution. However, owing to thermal fluctuation, recording with minute magnetic crystal grains becomes unstable. No problem will arise if the recording mark is large. However, if the recording mark is small, this leads to instability in recording or to an increase in noise. The reason for this is that if the recording mark is small, the number of magnetic crystal grains included in the recording mark decreases.

To avoid this problem, a magnetic recording medium called patterned medium is thought to be effective. In this magnetic recording medium, minute magnetic dots, which are composed of a recording material, are formed such that the minute magnetic dots are divided by non-recording regions. In the patterned medium, a single magnetic dot, which is divided by the non-recording region, becomes a single recording mark. Thus, interference between neighboring recording marks can be prevented.

There is an idea that a lithography technique is used in order to fabricate the patterned medium that includes divided magnetic dots, but there is a problem with this idea. Specifically, in the photolithography, a high throughput is obtained since batch-exposure is performed, but it is difficult to process sufficiently small recording cells. Besides, although microprocessing on the order of several-ten nm can be performed in electron-beam lithography or focused ion beam lithography, the throughput is poor in these techniques.

Under the circumstances, the following method has been studied as a method of fabricating the patterned medium at low cost. In this method, use is made of the phenomenon that a fine periodic structure is formed by the close packing of fine polymer particles or by the phase separation of a block copolymer. Using the fine periodic structure as a mask template, a magnetic film is processed, thereby forming an arrayed structure of divided magnetic dots.

In a method that self-assembling particles of the block copolymer are two-dimensionally disposed on the entire surface of a substrate, a structure that self-assembling particles are arrayed in a lattice fashion can be obtained. However, many defects and grain boundaries are present and lattices are randomly oriented. As a result, practical recording/reproduction cannot be realized.

In order to use patterns, which are obtained by the array of self-assembling particles, as magnetic dots of the patterned medium, there has been proposed a method in which concentric or spiral protrusions and recessed grooves, for instance, are provided on a disk substrate, and self-assembling particles are arrayed along the grooves (see Jpn. Pat. Appln. KOKAI Publication No. 2002-279616). The self-assembling particles are arrayed in the groove, with the crystal axis of the hexagonal lattice being aligned in the length direction of the groove. However, in this array process of self-assembling particles using the grooves, it is difficult to write servo patterns.

It is also possible to form servo patterns in advance as patterns of a magnetic material by some other lithography technique. In this method, however, the ratio of recesses to protrusions of the magnetic patterns differs between a data region which includes magnetic dots formed on the basis of self-assembling particles, and a servo region which includes a magnetic pattern formed by the other lithography technique. Consequently, there is a problem that vibration of the head occurs over the medium at the time of recording/reproduction, and the recording/reproduction becomes difficult.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the present invention, there is provided a magnetic recording medium comprising: a data region in which a plurality of recording tracks, each including magnetic dots arrayed in a down-track direction with a pitch p, are formed in a cross-track direction; and a servo region including a preamble in which a plurality of lines of magnetic dots, which are arrayed in a cross-track direction with a pitch p, are formed at equal intervals in the down-track direction. According to another aspect of the present invention, there is provided a method of fabricating the above magnetic recording medium, comprising: forming a magnetic layer and an insulation layer on a substrate; forming, in the insulation layer, grooves corresponding to the recording tracks along the down-track direction and grooves corresponding to the preamble along the cross-track direction; filling the grooves with a block copolymer and causing phase separation of the block copolymer to form dot-shaped polymer particles; and etching the magnetic layer using the dot-shaped polymer particles as a mask to form magnetic dots.

Figure 1:
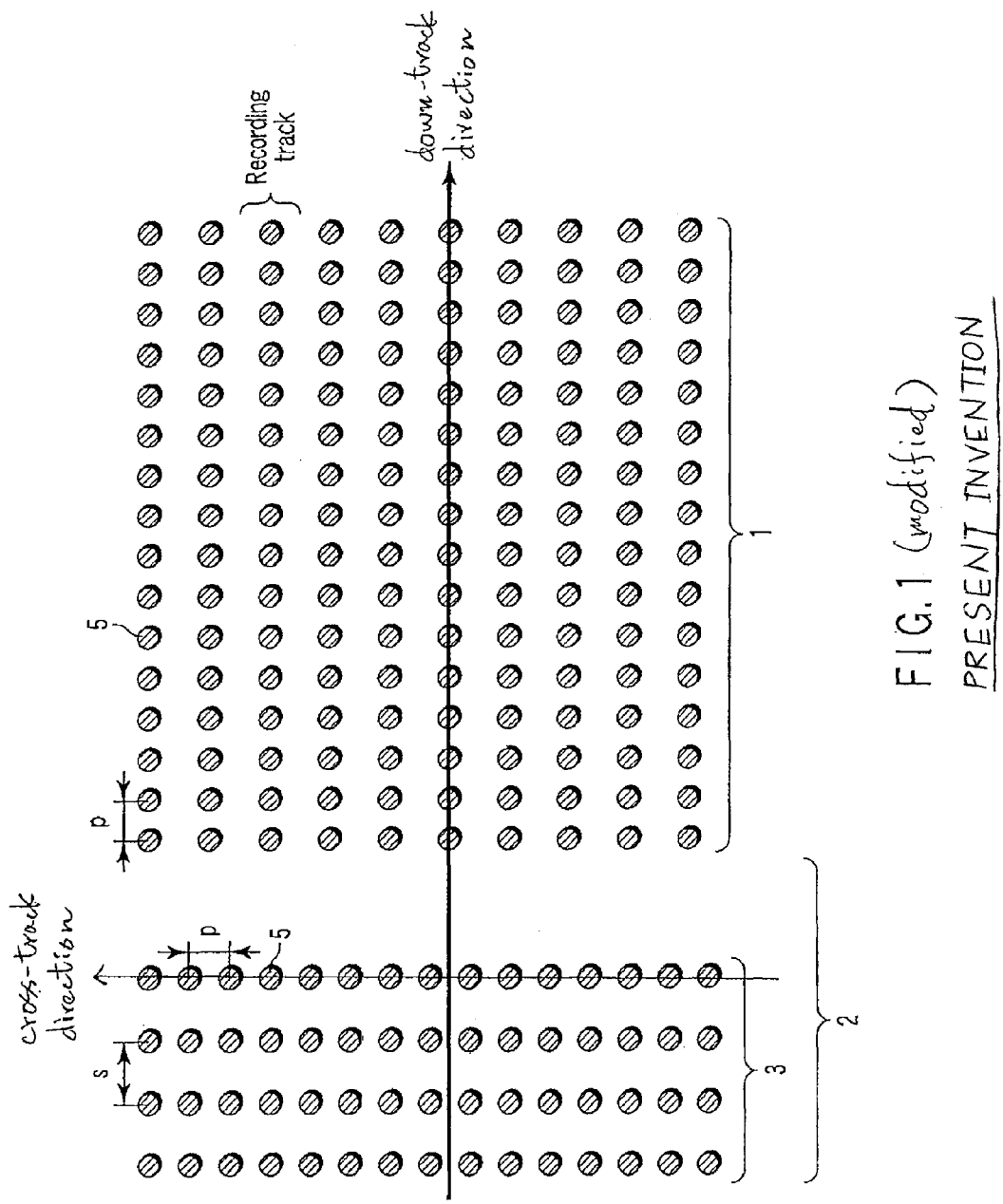
FIG. 1 is a plan view showing a part of a magnetic recording medium according to an embodiment of the present invention.

FIG. 1 is a plan view showing a part of a magnetic recording medium according to an embodiment of the present invention. As shown in FIG. 1, in a data region 1, a plurality of recording tracks are formed in a cross-track direction. Each recording track includes a line of magnetic dots 5 which are arrayed in a down-track direction (indicated by an arrow in FIG. 1) with a pitch p. In a preamble 3 of a servo region 2, a plurality of lines of magnetic dots 5, which are arrayed in the cross-track direction with the pitch p, are formed in the down-track direction at equal intervals (interval s). The servo region 2 includes an address part and a burst part (not shown), in addition to the preamble 3.

In this magnetic recording medium, the magnetic dots 5 are arrayed with the same periods both in the data region 1 and servo region 2. Since the ratio of recesses to protrusions of the magnetic patterns is substantially equal between the data region 1 and preamble 3, the flying stability of the head over the magnetic recording medium is improved.

A magnetic recording apparatus according to the embodiment of the invention includes the above-described magnetic recording medium and a read head which is attached to an actuator arm and moves over the magnetic recording medium in a radial direction. Since the actuator arm is driven by a voice coil motor and rotates about a pivot, the read head, which is assembled in a head slider that is supported by a suspension at a distal end portion of the actuator arm, moves over the magnetic recording medium so as to draw an arcuate locus.

Figure 2:
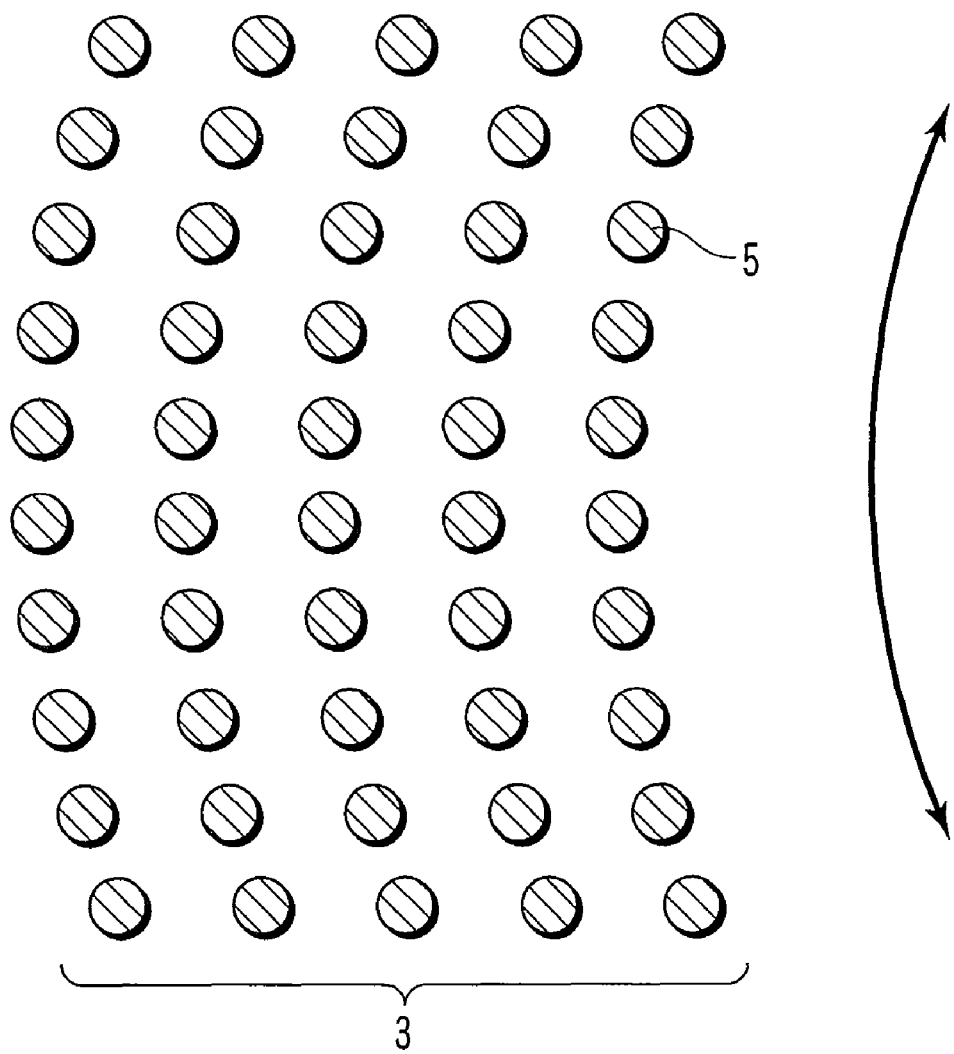
FIG. 2 is a plan view showing the shape of a preamble in the embodiment of the invention.

Accordingly, as shown in FIG. 2, it is preferable that the lines of magnetic dots 5 in the preamble 3 of the magnetic recording medium be disposed along a curve (arc) corresponding to the locus of the read head, as indicated by an arrow in FIG. 2.

In the magnetic recording apparatus according to the embodiment of the invention, it is preferable that the read width of the read head, which corresponds to the magnetic read-width on the servo area, be set at an integer number of times of the pitch p of the magnetic dots 5.

A reference signal of the servo region for performing positioning is generated from the preamble in the magnetic recording medium according to the embodiment of the invention. Thus, no matter where the read head is present on the recording medium, a signal of the same intensity needs to be generated. Therefore, in order to obtain a signal with a constant intensity from the preamble on which the magnetic dot lines arrayed with the pitch p are formed in the cross-track direction, regardless of the position of the head, it is preferable that the read width of the read head in the cross-track direction be set at an integer number of times of the pitch p of the magnetic dots.

Figure 3A:
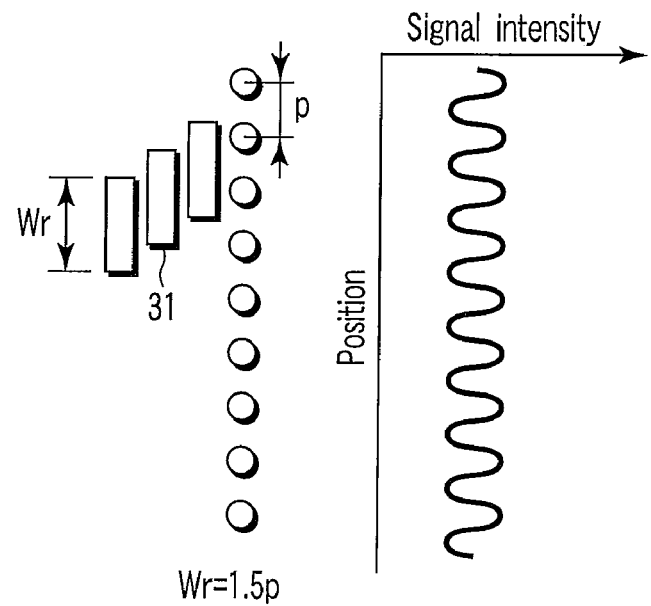
FIGS. 3A and 3B are views for explaining the relationship between a read width by a read head and signal intensity.
Figure 3B:
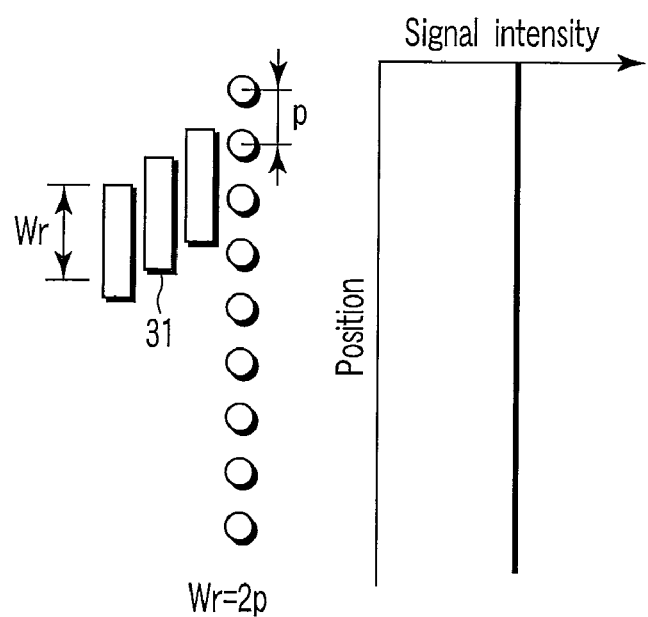

Referring now to FIG. 3A and FIG. 3B, the relationship between the read width of the read head and the signal intensity is explained.

FIG. 3A shows the case in which the read width of a read head 31 is 1.5 times the pitch p of the magnetic dot 5, i.e., a non-integer number of times of the pitch p. In this case, the area of the magnetic dots 5, which are included in the area range just under the read head 31, varies depending on the position of the head, and so the signal intensity of the magnetic dots 5 read by the read head 31 varies. Consequently, since the distribution of the signal intensity from the preamble fluctuates in accordance with the pitch p of the magnetic dots 5, it is difficult to satisfactorily perform the function of the preamble.

FIG. 3B shows the case in which the read width of the read head 31 is two times the pitch p of the magnetic dot 5, i.e., an integer number of times of the pitch p. In this case, the area of the magnetic dots 5, which are included in the area range just under the read head 31, is always constant regardless of the position of the head, and so the signal intensity of the magnetic dots 5, which are read by the read head 31, becomes constant. Therefore, in the magnetic recording medium of the embodiment of the invention, the function of the preamble can be satisfactorily performed.

The magnetic recording medium according to the embodiment of the present invention can be fabricated by performing etching, making use of an ordered array structure which occurs when a block copolymer is self-assembled through phase separation.

The self-assembling material is such a material that the material itself forms a prescribed periodic structure in a self-assembling fashion. The self-assembling material is not limited to the block copolymer which causes phase separation, and polymer beads forming a close-packed structure can be used. However, since the self-assembling material itself forms a periodic structure regardless of the direction and position on the substrate, it is necessary to control the direction and position of the self-assembled array in order to fabricate the magnetic recording medium according to the embodiment of the invention.

In a method according to the embodiment of the invention, a magnetic layer and an insulation layer are formed on a substrate. Grooves corresponding to recording tracks along the down-track direction, and grooves corresponding to the preamble along the cross-track direction, are formed in the insulation layer. Making use of the phase separation of the block copolymer in the grooves, properly arrayed magnetic dots are formed.

Figure 4A:
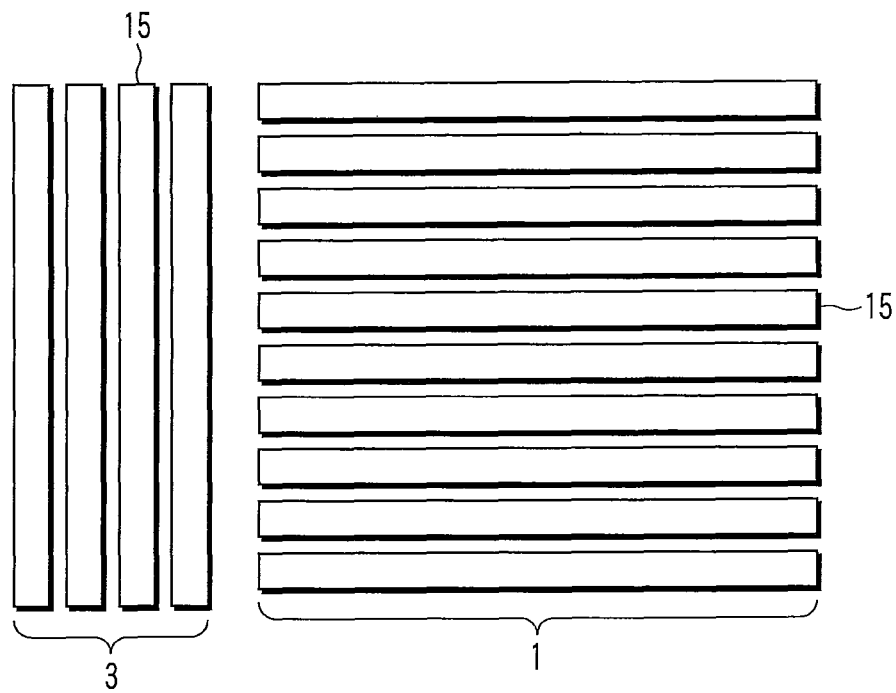
FIGS. 4A and 4B schematically illustrate a method of fabricating the magnetic recording medium according to the embodiment of the invention.
Figure 4B:
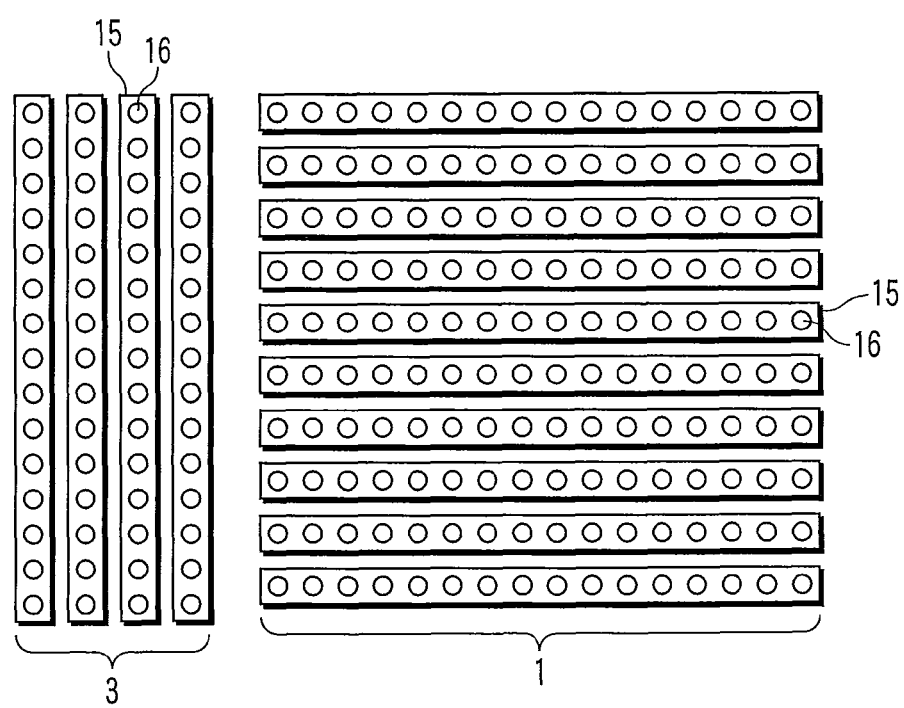

Referring now to plan views of FIGS. 4A and 4B, the outline of the method of fabricating the magnetic recording medium according to the embodiment of the invention is described.

As shown in FIG. 4A, a magnetic layer and an insulation layer are formed on a substrate, and grooves 15 for guiding arrays of self-assembling material are formed in the insulation layer by lithography. At this time, in the data region 1, grooves 15 corresponding to the recording tracks in the down-track direction are formed at equal intervals. In the servo region, grooves 15 corresponding to the preamble 3 in the cross-track direction are formed at equal intervals.

As shown in FIG. 4B, if a block copolymer is filled in the grooves 15 that have been formed as described above and phase separation is caused in the block copolymer, dot-shaped polymer particles 16 are regularly arrayed along the direction of the grooves. As a result, in the recording tracks of the data region 1, the dot-shaped polymer particles 16 are arrayed in the down-track direction with the pitch p. In the preamble 3 of the servo region, the dot-shaped polymer particles 16 are arrayed in the cross-track direction with the pitch p. The magnetic layer is etched by using the thus formed polymer particles 16 as a mask template to form magnetic dots. Thus, the magnetic recording medium (patterned medium) according to the embodiment of the invention can be formed.

Next, referring to FIGS. 5A, 5B, 5C, 5D, 5E and 5F, the method of fabricating the magnetic recording medium according to the embodiment of the invention is described in greater detail.

Figure 5A:
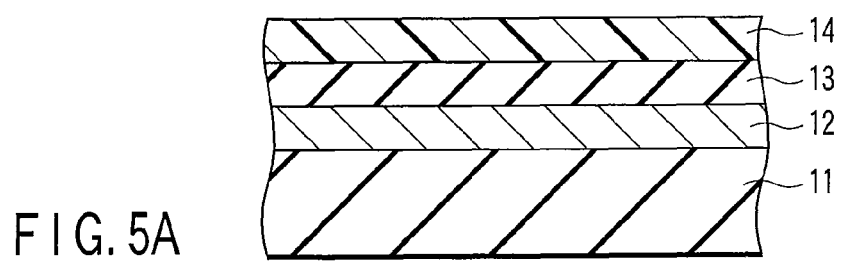
FIGS. 5A, 5B, 5C, 5D, 5E and 5F are cross-sectional views illustrating the method of fabricating the magnetic recording medium according to the embodiment of the invention.

As shown in FIG. 5A, a magnetic layer 12 is formed on a glass disk substrate 11 with a diameter of 2.5 inches. The magnetic layer 12 includes a Pd underlayer with a thickness of about 30 nm, and a CoCrPt perpendicular magnetic recording layer with a thickness of about 50 nm. A $SiO_2$ film 13 with a thickness of about 50 nm is deposited on the magnetic layer 12. A resist 14 is spin-coated on the $SiO_2$ film 13.

Figure 5B:
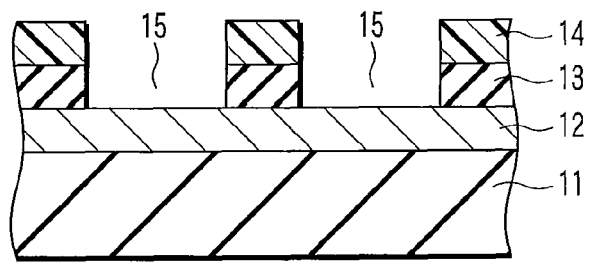

As shown in FIG. 5B, using a pre-fabricated stamper having desired patterns of recesses and protrusions, the resist 14 is processed by nano-imprinting lithography. In the data region, resist patterns of protrusions each having a width of 80 nm are formed concentrically along the down-track direction, with grooves each having a width of 160 nm being interposed. In the preamble part of the servo region, resist patterns of protrusions each having a width of 80 nm are formed in an arcuate shape along the cross-track direction, with grooves each having a width of 160 nm being interposed.

Figure 6A:
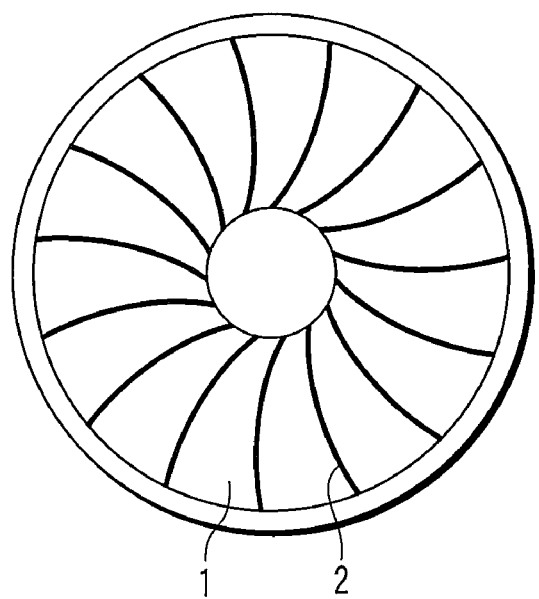
FIGS. 6A and 6B are plan views showing the shape of a servo region and a locus of the read head.
Figure 6B:
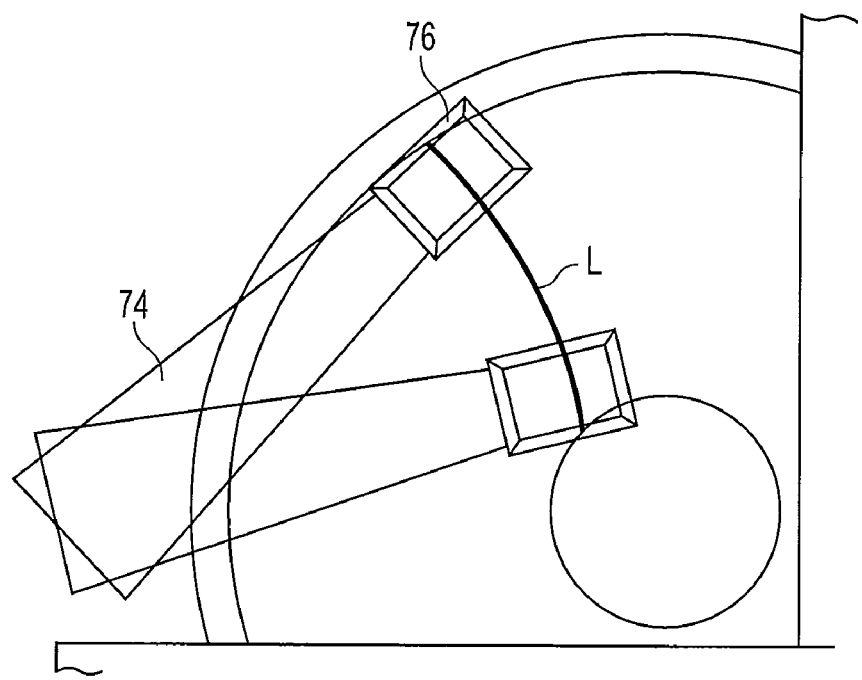

As shown in FIG. 6A, the servo region 2 including the preamble is formed in the arcuate shape on the disk substrate. As shown in FIG. 6B, the servo region 2 is formed along the arc corresponding to a locus L over the disk of an actuator arm 74, a head slider 76 and a read head that is assembled in the head slider 76.

Using the patterned resist 14 as a mask, the $SiO_2$ film 13 is etched by RIE to a level reaching the magnetic layer 12, and the grooves 15 are transferred to the $SiO_2$ film 13. The grooves 15 thus formed are used for the recording tracks and preamble parts.

Figure 5C:
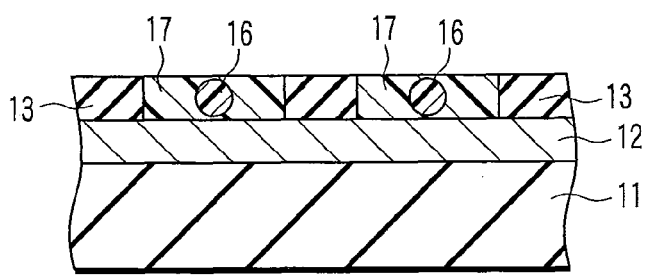

As shown in FIG. 5C, the grooves 15 between the protruded $SiO_2$ films 13a are filled with a block copolymer, which is self-assembled, as described below. To begin with, the surface of the magnetic layer 12 in the grooves 15 is made hydrophobic by treatment with hexamethyldisilazane. Subsequently, the residual of the patterned resist is subjected to ashing. A solution is prepared in which a block copolymer of polystyrene (PS)-polybutadiene (PB) (the molecular weight Mw of PS=4000, the molecular weight Mw of PB=20000) is dissolved at a concentration of 1% w/w in toluene. This solution is spin-coated on the substrate so as to fill the grooves 15 between the protruded $SiO_2$ films 13 with the block copolymer. The substrate is annealed for 30 hours at 150° C. in a vacuum, and the block copolymer is self-assembled. As a result, an ordered array structure is formed in which island-shaped polystyrene particles 16 surrounded by sea-shaped polybutadiene 17 are periodically arrayed with a pitch of 60 nm.

Figure 5D:
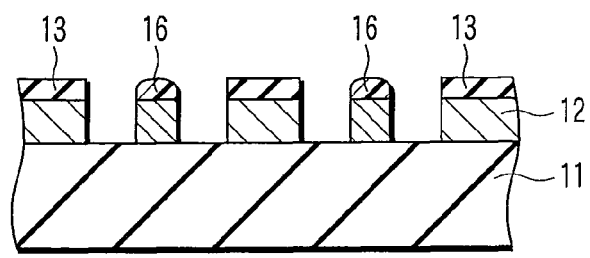

As shown in FIG. 5D, using the ordered array of polystyrene particles as a mask, the magnetic layer 12 is etched to form magnetic dots as described below. After the block copolymer is ozone-treated to remove the polybutadiene (PB), the resultant structure is rinsed with water. Using the residual polystyrene particles 16 as a mask, the magnetic layer 12 is etched by Ar ion milling to form magnetic dots.

Figure 5E:
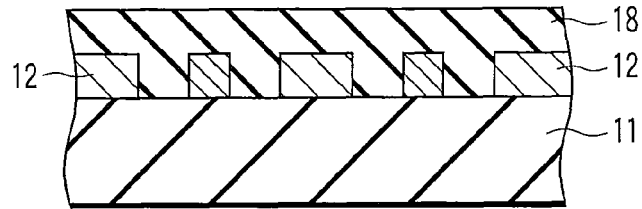

As shown in FIG. 5E, after the residual of the polystyrene particles 16 are ashed, an $SiO_2$ film 18 with a thickness of about 50 nm is deposited on the entire surface so as to fill the recesses between the magnetic dots as a matrix.

Figure 5F:
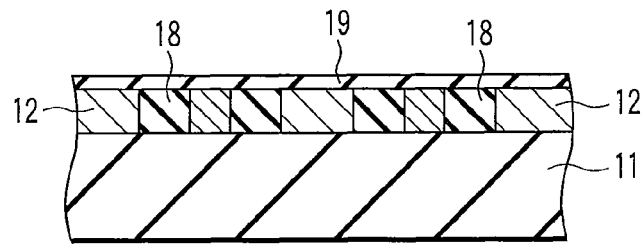

As shown in FIG. 5F, the surface of the $SiO_2$ film 18 is polished and planarized by chemical mechanical polishing (CMP). Then, diamond-like carbon is deposited to form a protection film 19.

In the magnetic recording medium according to this embodiment, the track pitch is set at 160 nm, and the magnetic dots are arrayed with a pitch of 60 nm in the recording tracks and preamble parts. A magnetic recording apparatus is manufactured by using this magnetic recording medium and a read/write head having a read head with a read width of 120 nm. With this magnetic recording apparatus, since the preamble of the medium includes ordered array of magnetic dots, the flying stability of the head is improved. On the other hand, with a magnetic recording apparatus in which a preamble formed by lithography is installed, the head is vibrated and brought into contact with the medium at the time of read/write, thus head crash is caused.

Figure 7:
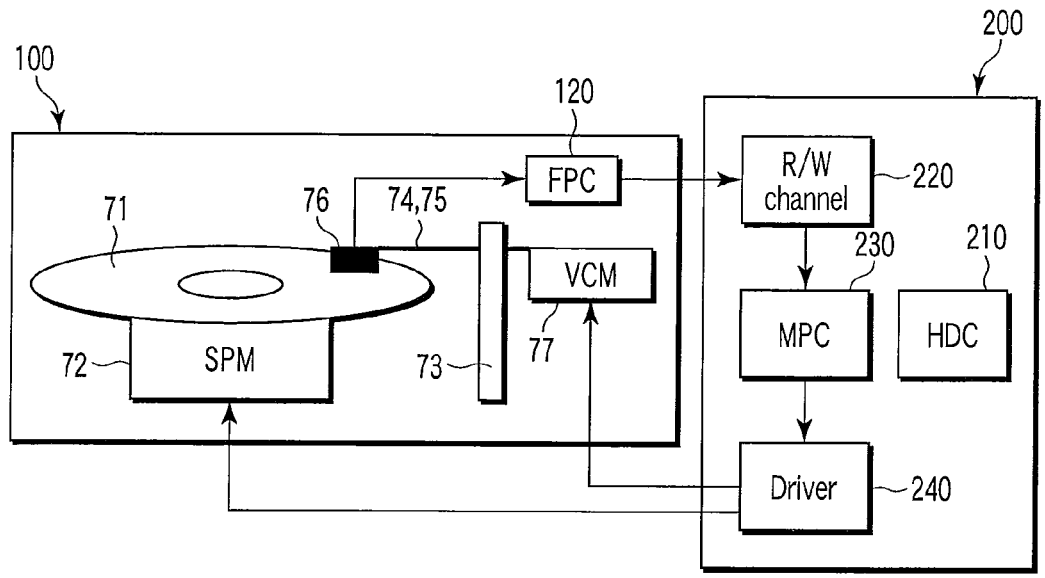
FIG. 7 is a block diagram of a magnetic recording apparatus according to the embodiment of the invention.

FIG. 7 shows a block diagram of the magnetic recording apparatus (hard disk drive) according to an embodiment of the present invention. This figure shows the head slider only above the top surface of the magnetic disk. However, the perpendicular magnetic recording layer is formed on each side of the magnetic disk as described above. A down head and an up head are provided above the bottom and top surfaces of the magnetic disk, respectively. It should be noted that the drive construction is similar to that of the prior art except that the magnetic disk employed is that according to the embodiment of the invention.

The disk drive includes a main body unit called a head disk assembly (HDA) 100 and a printed circuit board (PCB) 200.

As shown in FIG. 7, the head disk assembly (HDA) 100 has the magnetic disk 71, the spindle motor 72, which rotates the magnetic disk, the head slider 76, including the read head and write head, the suspension 75 and actuator arm 74, the voice coil motor (VCM) 77, and a head amplifier (HIC), which is not shown. The head slider 76 is provided with the read head including the GMR element and the write head including the single pole.

The head slider 76 is elastically supported by a gimbal provided on the suspension 75. The suspension 75 is attached to the actuator arm 74, which is rotatably attached to the pivot 73. The voice coil motor (VCM) 77 generates a torque around the pivot 73 for the actuator arm 74 to move the head in the radial direction of the magnetic disk 71. The head amplifier (HIC) is fixed to the actuator arm 74 to amplify input signals to and output signals from the head. The head amplifier (HIC) is connected to the printed circuit board (PCB) 200 via a flexible print cable (FPC) 120. Providing the head amplifier (HIC) on the actuator arm 74 enables to reduce noise in the head signals effectively. However, the head amplifier (HIC) may be fixed to the HDA main body.

As described above, the perpendicular magnetic recording layer is formed on each side of the magnetic disk 71, and the servo regions each shaped like an arc are formed so as to correspond to the locus of the moving head. The specifications of the magnetic disk meet outer and inner diameters and read/write characteristics adapted to a particular drive. The radius of the arc formed by the servo region is given as the distance from the pivot to the magnet head element.

Four major system LSIs are mounted on the printed circuit board (PCB) 200. The system LSIs are a disk controller (HDC) 210, a read/write channel IC 220, a MPU 230, and a motor driver IC 240.

The MPU 230 is a control unit of a driving system and includes ROM, RAM, CPU, and a logic processing unit which implement a head positioning control system according to the present embodiment. The logic processing unit is an arithmetic processing unit composed of a hardware circuit to execute high-speed calculations. Firmware (FW) for the logic processing circuit is stored in the ROM. The MPU controls the drive in accordance with FW.

The disk controller (HDC) 210 is an interface unit in the hard disk drive which manages the whole drive by exchanging information with interfaces between the disk drive and a host system (for example, a personal computer) and with the MPU, read/write channel IC, and motor driver IC.

The read/write channel IC 220 is a head signal processing unit relating to read/write operations. The read/write channel IC 220 is composed of a circuit which switches the channels of the head amplifier (HIC) and which processes read/write signals in read/write operations.

The motor driver IC 240 is a driver unit for the voice coil motor (VCM) 77 and spindle motor 72. The motor driver IC 240 controls the spindle motor 72 so that the motor 72 can rotate at a constant speed and provides a current, which is determined based on a VCM manipulating variable from the MPU 230, to VCM 77 to drive the head moving mechanism.

Figure 8:
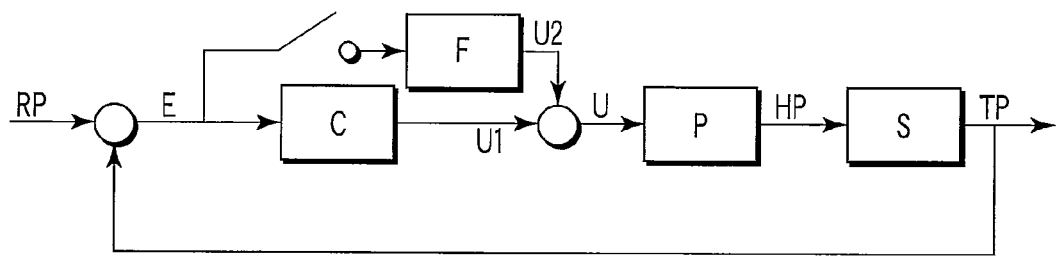
FIG. 8 is a block diagram showing a control mechanism for positioning the head of the magnetic recording apparatus according to the embodiment of the invention.

A control mechanism for head positioning will be described with reference to FIG. 8. This figure is a block diagram showing head positioning. The symbols C, F, P, and S mean system transfer functions. The control target P specifically corresponds to head moving means including VCM. The signal processing unit S is specifically implemented by the read/write channel IC and MPU (executing a part of off-track detection processing).

The control processing unit is composed of a feedback control unit C (first controller) and a synchronism compensating unit F (second controller). The control processing unit is specifically implemented by MPU.

Operations of the signal processing unit S will be described later in detail. The signal processing unit S generates information on the current track position (TP) on the disk on the basis of read signals from a servo region on the disk immediately below the head position (HP).

On the basis of the positional deviation (E) between a target track position (RP) on the disk and the current position (TP) of the head on the disk, the first controller outputs a FB operation value U1 that reduces the positional deviation.

The second controller is a FF compensating unit that compensates for the shapes of the tracks on the disk and vibration that occurs in synchronism with the rotation of the disk. The second controller saves pre-calibrated rotation synchronization compensating values to a memory table. The second controller normally makes reference to the table on the basis of servo sector information (not shown) provided by the signal processing unit S to output an FF operation value U2 without use of positional deviation (E).

The control processing unit adds the outputs U1 and U2 of the first and second controllers to supply a control operation value U to VCM 77 via the disk controller (HDC) 210 to drive the head.

The synchronization compensating value table is calibrated during an initializing operation. When the positional deviation (E) becomes equal to or larger than a set value, a re-calibrating process is started to update the synchronization compensating value.

A method for detecting a positional deviation from read signals of a servo region will be briefly described. The magnetic disk is rotated by the spindle motor at a constant rotation speed. The head slider is designed to be elastically supported by the gimbal provided on the suspension and to retain a very small flying height balancing with air pressure resulting from the rotation of the magnetic disk. Thus, the GMR element, included in the read head, detects a leakage flux from the recording layer of the magnetic disk across a predetermined magnetic spacing. The rotation of the magnetic disk causes each servo region in the magnetic disk to pass immediately below the head at a constant period. A servo process can be executed by detecting track position information on the basis of read signals from the servo region.

Upon finding an identification flag for the servo region called a servo mark, the disk controller (HDC) can predict timing when the servo region passes immediately below the head on the basis of the periodicity of the servo region. Thus, the disk controller (HDC) causes the channel to start a servo process at a time when the preamble section will pass immediately below the head.

Figure 9:
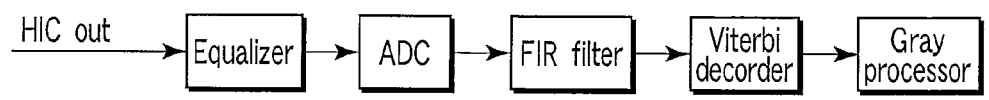
FIG. 9 is a block diagram showing an address reproduction process unit in a channel of the magnetic recording apparatus according to the embodiment of the invention.

With reference to the block diagram in FIG. 9, an address reproducing process in the channel will be described. Read output signals from the head amplifier IC (HIC) are loaded into the channel IC and subjected to an analog filtering process (longitudinal signal equalizing process) by an equalizer, and then sampled as digital values by an analog-to-digital converter (ADC).

A leakage flux from the magnetic disk according to the present embodiment is a perpendicular field corresponding to the magnetic patterns. However, all DC offset components are removed from the leakage flux by high-pass characteristics of the head amplifier (HIC) and the longitudinal equalizing process by the equalizer in the earlier stage of the channel IC. As a result, an output signal from the preamble after the analog filtering process becomes an almost pseudo sine wave.

The channel IC switches the process in accordance with read signal phases. Specifically, the channel IC executes, for example, a process of pulling into synchronism of synchronizing a read signal clock with a media pattern period, an address reading process of reading sector and cylinder data, and a burst process for detecting the off-track amount.

The process of pulling into synchronism will be described briefly. In this process, a process of synchronizing timing for ADC sampling with sinusoidal read signals and an AGC process of matching the signal amplitude of digital sampling values at a certain level are executed. The periods of the bits 1 and 0 of the media pattern are sampled at four points.

In the address reading process, the sampling values are subjected to noise reduction in FIR, and then converted into sector and track data by the Viterbi decoding process, based on maximum likelihood estimation, or the Gray code inverse transformation process. This makes it possible to acquire servo track information of the head.

Then, the channel shifts to the process of detecting the off-track amount in the burst section. This process is not illustrated but proceeds as follows. Signal amplitudes are subjected to sample-hold integration in the order of the burst signal patterns A, B, C, and D. A voltage value corresponding to the average amplitude is output to MPU. A servo process interruption is then issued to MPU. Upon receiving the interruption, MPU uses the internal ADC to load the burst signals in a time series manner. DSP then converts the signals into an off-track amount. The servo track position of the head is precisely detected on the basis of the off-track amount and the servo track information.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording medium comprising:
   a data region in which a plurality of recording tracks, each including magnetic dots arrayed in a down-track direction with a pitch p, are formed in a cross-track direction; and
   a servo region including a preamble in which a plurality of lines of magnetic dots, which are arrayed in the cross-track direction with the pitch p along a curve corresponding to a locus of a read head attached to an actuator arm, are formed at equal intervals in the down-track direction,
   wherein the magnetic dots are arrayed with same periods both in the data region and the servo region.

2. A method of manufacturing a magnetic recording medium according to claim 1 comprising:
   forming a magnetic layer and an insulation layer on a substrate;
   forming, in the insulation layer, grooves corresponding to respective recording tracks in the down-track direction and grooves corresponding to respective lines of magnetic dots in the preamble in the cross-track direction;
   filling the grooves with a block copolymer and causing phase separation of the block copolymer to form dot-shaped polymer particles; and
   etching the magnetic layer using the dot-shaped polymer particles as a mask to form magnetic dots.

* * * * *